(12) United States Patent
Lutnaes

(10) Patent No.: US 6,309,100 B1
(45) Date of Patent: Oct. 30, 2001

(54) LCD TEMPERATURE SENSING

(75) Inventor: Sturla Lutnaes, Ulleråkersvägen (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/350,267

(22) Filed: Jul. 6, 1999

(30) Foreign Application Priority Data

Jul. 6, 1998 (SE) .................................................. 9802460

(51) Int. Cl.$^7$ .............................. G01K 1/16; G02F 1/133
(52) U.S. Cl. ........................... 374/183; 349/12; 374/141
(58) Field of Search ................................. 349/12, 72, 21; 345/101, 173; 374/183, 141

(56) References Cited

U.S. PATENT DOCUMENTS

| | | | |
|---|---|---|---|
| 4,621,261 | 11/1986 | Hehlen et al. | 340/825.52 |
| 4,838,656 | * 6/1989 | Stoddard | 350/336 |
| 4,931,782 | * 6/1990 | Jackson | 340/706 |
| 5,029,982 | 7/1991 | Nash | 350/331 T |
| 5,149,919 | * 9/1992 | Greanias et al. | 178/19 |
| 5,523,873 | * 6/1996 | Greanias et al. | 178/19 |
| 5,852,487 | * 12/1998 | Fujimori et al. | 349/162 |
| 5,907,375 | * 5/1999 | Nishikawa et al. | 349/12 |
| 5,936,696 | 8/1999 | Daijogo et al. | 349/161 |
| 5,963,277 | * 10/1999 | Kim et al. | 349/12 |
| 6,020,945 | * 2/2000 | Sawai et al. | 349/119 |
| 6,035,180 | * 3/2000 | Kubes et al. | 455/90 |
| 6,057,903 | * 5/2000 | Colgan et al. | 349/139 |
| 6,069,675 | * 5/2000 | Mizobata et al. | 349/12 |
| 6,088,068 | * 6/2000 | Halttunen et al. | 349/12 |
| 6,088,069 | * 7/2000 | Farlow | 349/12 |
| 6,089,751 | * 7/2000 | Conover et al. | 374/183 |
| 6,091,376 | * 7/2000 | Takewaka | 345/7 |
| 6,104,447 | * 8/2000 | Faris | 349/5 |

FOREIGN PATENT DOCUMENTS

| | | |
|---|---|---|
| 54064998 | 5/1979 | (JP) . |
| 54103366 | 8/1979 | (JP) . |
| 59197020 | 11/1984 | (JP) . |
| 40423412A | * 8/1992 | (JP) . |
| 8114785 | 10/1994 | (JP) . |
| 9160001 | 12/1995 | (JP) . |
| 93/12453 | 6/1993 | (WO) . |
| 98/29779 | 7/1998 | (WO) . |

OTHER PUBLICATIONS

W. Balzer, et al, "Combination of heating and temperature measurement in a compact liquid–crystal cell," pp. 568–571.

* cited by examiner

*Primary Examiner*—Diego Gutierrez
*Assistant Examiner*—Gail Verbitsky
(74) *Attorney, Agent, or Firm*—Burns, Doane, Swecker & Mathis, L.L.P.

(57) ABSTRACT

The temperature of a liquid crystal display (LCD), for example provided in a mobile telephone, is measured by covering the LCD with a conductive touch screen bottom sheet having a known resistance-temperature relationship. A temperature-stable resistor is connected to the touch screen bottom sheet, and a voltage is applied across the resistor and the sheet. The voltage signal between the resistor and the touch screen bottom sheet is measured and converted to digital representation by an A/D-converter. The measured voltage signal is used to calculate the temperature of the touch screen bottom sheet, which is substantially equal to the temperature of the LCD.

15 Claims, 5 Drawing Sheets

LCD TEMPERATURE SENSING

BACKGROUND

The invention concerns a device for measuring the temperature near the liquid crystals of a liquid crystal display (LCD), and more specifically a device for measuring the temperature near the liquid crystals of a liquid crystal display (LCD) covered with a touch screen.

There is a growing market for electronic devices of the type having a LCD display for displaying visual information and a touch screen covering the LCD by which the user communicates with the device.

Liquid crystals are characterized by their ability to change their optical properties in response to applied electromagnetic fields. This has made them ideal for displaying altering information, such as in liquid crystal displays (LCD). This ability is affected by the temperature of the liquid crystals, which in its turn is dependent on a number of factors, such as air temperature, radiation from the sun, heat generated by electronic equipment in the vicinity of the display etc. The effects of varying LCD temperature is especially pronounced when the optical state of the liquid crystals is determined by low-voltage multiplexing technique, since this puts high requirements on the flexibility of the crystals.

It is therefore desirable to determine as close as possible the actual temperature of the liquid crystals. To obtain as good an estimation as possible of the temperature of the liquid crystals a temperature sensor should be disposed as near the liquid crystals as possible. Numerous patents are concerned with this task.

For example, the abstract of the Japanese patent JP-A-9-160001 describes a LCD control system wherein the contrast of the LCD is controlled by way of measuring the ambient temperature, and adjusting the contrast after comparing the measured temperature to a stored temperature and a contrast setting associated with the stored temperature. A similar system is also described in the abstract of the Japanese patent JP-A-8-114785. Such a control system has the disadvantage that the contrast adjustment is based on an ambient temperature that may differ considerably from temperature of the liquid crystals. This is the case regardless of whether the temperature is measured outside of the equipment in which the LCD is mounted, or inside the housing of the equipment.

It is also known, for example through JP-A 9-258161, to attach a small thermocouple sensor on a LCD display in order to measure its temperature. However, this has the disadvantage that only a point estimation of the LCD temperature is obtained. Therefore, considerable errors could occur, for example in a case where sunlight falls on only a part of the equipment.

Furthermore, through the Japanese patent publication No. 54-064998 it is known to cover a surface of a LCD display with a tin oxide film, and measuring the resistance of the tin oxide film to determine the temperature of the LCD. The tin oxide film may also act as a heating means, to provide a suitable operation temperature to the liquid crystals. If practiced in conjunction with a touch screen, this invention has the disadvantage that even a highly transparent additional temperature sensing layer would undesirably reduce the visual contrast of the LCD. Since the touch screen that covers the LCD causes a certain loss of contrast and brilliance in itself, it is generally not desirable to cover the LCD with yet another transparent sheet.

SUMMARY

It is a general object of the invention to provide a device for measuring the temperature of a LCD provided with a touch screen, wherein the measurement is performed within the touch screen very near the liquid crystals and gives an integral temperature estimation substantially over the entire LCD area.

This and other objects are achieved by the invention as defined in the accompanying claims.

Thus, in a first aspect of the present invention there is provided a device for measuring the temperature of a LCD provided with a touch screen.

According to this aspect of the invention, one of the sheets constituting the touch screen, namely the bottom sheet being disposed adjacent to the LCD surface, is provided with a transparent conductive layer having a known relationship between temperature and its electrical resistance. At selected intervals the resistance of the transparent layer is measured and interpreted as the temperature of the touch screen bottom sheet.

As the touch screen bottom sheet is in thermal contact with the LCD surface, and as the LCD glass sheet that parts the liquid crystals from the touch screen bottom sheet has excellent heat conductivity, the temperature of the touch screen bottom represents a good estimation of the temperature of the liquid crystals of the LCD.

Furthermore, as the touch screen bottom sheet covers substantially the entire LCD area the measured electrical resistance of the touch screen bottom sheet represents an overall estimation which, in cases of uneven temperature distribution, is an integral measure of both warmer and cooler areas on the LCD.

In general, the components necessary to carry out the invention are already present in a LCD/touch screen assembly. Any additional components are of low cost and are easy to assemble, thereby providing for cost effective production.

Apart from being cost effective, the invention makes it unnecessary to provide an additional temperature sensing transparent sheet in addition to the touch screen, thereby avoiding an undesired reduction in the visual contrast of the LCD.

Thus, the present invention shows a number of advantages, such as:
  high precision estimation of the liquid crystal temperature as the temperature measurement is made very near the liquid crystals,
  temperature measurement that is sensitive to temperature gradients across the LCD display, since the measurement is made across the entire LCD surface,
  cost efficiency due to few new components, said components being cheap and easy to assemble, and
  combination of the temperature sensor with the already present touch screen avoids further contrast losses.

In a second aspect of the present invention is provided a method for manufacturing a device according to the invention there.

BRIEF DESCRIPTION OF THE DRAWINGS

The present invention will now be described, by way of examples only, with reference to the attached drawings, wherein.

It should be noted that same reference numbers in different figures relate to same components.

DETAILED DESCRIPTION OF EMBODIMENTS

An embodiment of a the present invention shall now be described.

Figure 1:
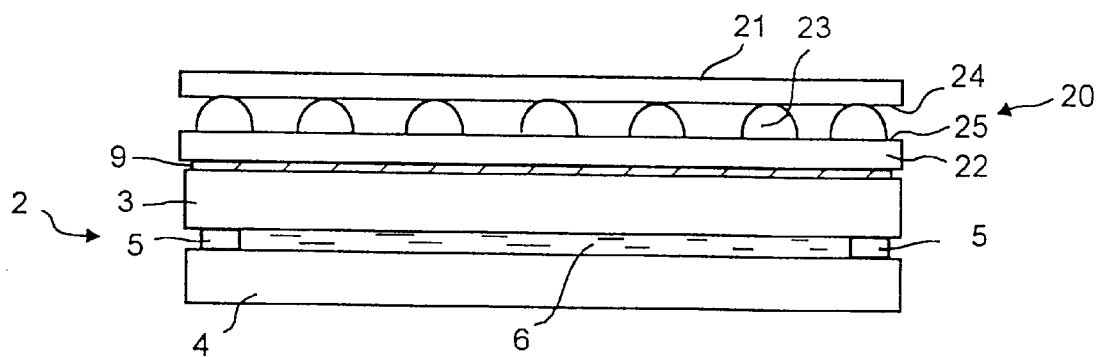
FIG. 1 is a schematic sectional side view of a LCD and touch screen assembly for use with the present invention.

FIG. 1 is a schematic sectional side view of a typical conventional LCD/touch screen assembly suitable for use with the present invention. The assembly includes a touch screen 20 covering a liquid crystal display (LCD) 2. The LCD 2 comprises a top glass sheet 3, a bottom glass sheet 4, and distance elements 5 and liquid crystals 6 disposed between the top and bottom glass sheets. Typically, the LCD is attached to a PC board (not shown). The touch screen 20 comprises a top sheet 21, a bottom sheet 22 and spacers 23. The touch screen 20 could be fixed to the LCD top glass sheet 3 by means of an adhesive layer 9, as shown, provided that the adhesive layer has good thermal conductivity. However, in order to ensure best possible thermal conductivity between the top glass sheet and the touch screen bottom sheet it is preferred that the touch screen is disposed directly onto the LCD.

The top sheet 21 of the touch screen 20 is typically made from a plastic material, such as a polyester film. The bottom sheet 22 is typically made from a plastic material, such as a polyester film, or a glass sheet. On the inner surfaces, i.e. the surfaces facing each other, the sheets 21, 22 are covered with a conductive layer, typically indium tin oxide 24, 25, respectively. Thus, when the user presses the touch screen, thereby contacting the top and bottom sheets, i.e. the conductive layers 24, 25 of the sheets, an electrical voltage signal can be transferred through the conductive layers 24, 25.

Figure 3:
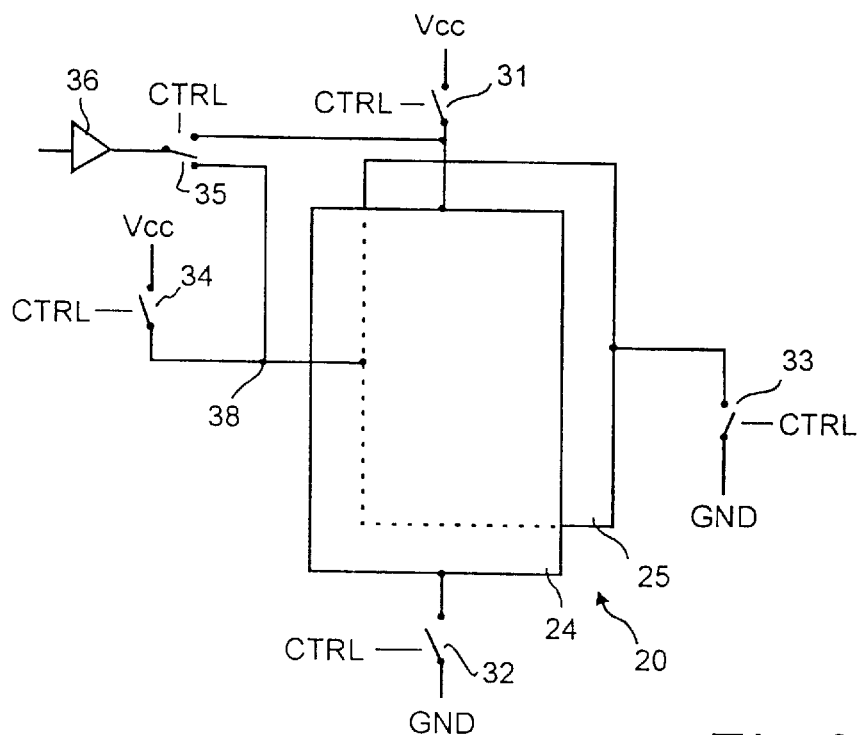
FIG. 3 is a circuit diagram showing a typical conventional circuit for use with a touch screen.

Conventionally, a typical touch screen 20 is connected to the equipment at hand as in the example of a circuit diagram illustrated in FIG. 3. A control unit (not shown, but indicated by the circuit lines CTRL) opens and closes the switches 31, 32, 33, 34, 35. An analog-to-digital (A/D) converter 36 is provided to convert measured voltage values from analog to digital representation.

As the function of a touch screen is not in itself the subject of the present invention, it shall be described only very briefly by way of example as a background to the understanding of the invention.

When the user presses the touch screen at a certain point, the top and bottom sheet conductive layers 24 and 25 are short circuited at that point, as described above. For determining the position of this point, the control unit first closes the switches 31 and 32 to provide a voltage Vcc across the conductive layer 24 of the touch screen top sheet 2.1, opens the switches in 33 and 34 and puts the switch 35 in a state connecting the A/D-converter 36 to the conductive layer 25 of the touch screen bottom sheet 22 via connection point 38.

A first voltage, the magnitude of which is dependent on the position where the user has short circuited the touch screen, is output by the A/D-converter to any suitable registering means. This first voltage gives a representation of the vertical position (when viewed in FIG. 3) of the area pressed by the user. In a subsequent step the control unit opens switches 31 and 32, closes switches 33 and 34 and puts the switch 35 in a state connecting the A/D-converter 36 to the touch screen top sheet 21. The corresponding transverse position of the area pressed by user is then determined in an analogous way.

According to the invention, the temperature of the liquid crystals can be obtained by determining the temperature of the touch screen bottom sheet. This is achieved, according to the invention, by introducing a temperature stable resistor Rs in series with the conductive layer 25 of the touch screen bottom sheet 22, whereby the conductive layer has a temperature dependent resistance Rts. At selected intervals a voltage Vcc is applied over the series of the resistor Rs and the touch screen bottom sheet (Rts), and the voltage level Vts between the resistor Rs and the touch screen bottom sheet Rts is measured.

Figure 4:
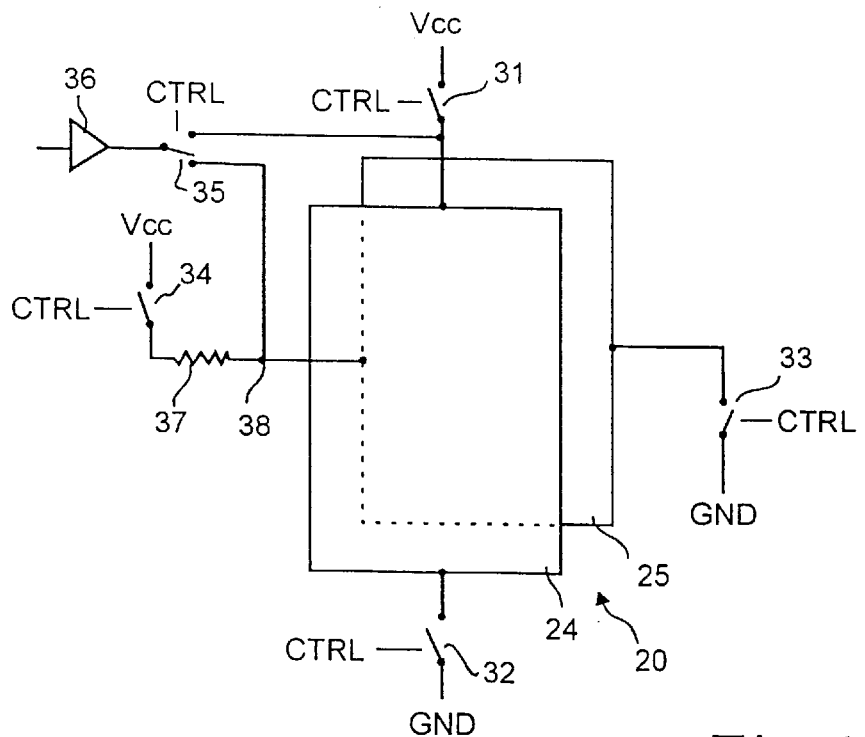
FIG. 4 is a circuit diagram of a LCD temperature measuring device according to the invention combined with a touch screen.
Figure 5:
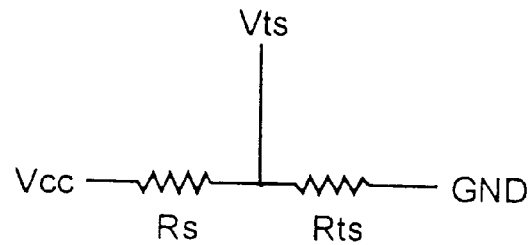
FIG. 5 is a simplified circuit diagram showing resistances and voltages of a temperature measuring device according to the invention.

This is illustrated in the simplified circuit diagram of FIG. 4, which corresponds to the conventional circuit of FIG. 3, showing a circuit according to the invention wherein a temperature stable resistor 37 having a resistance Rs is disposed between the switch 34 and the connection point 38. The conductive layer 25 of the touch screen bottom sheet 22 has a temperature sensitive resistance Rts. A voltage Vts between the resistor 37 and the touch screen bottom sheet 22 is measured at the connection point 38. This is illustrated in the schematical diagram of FIG. 5.

Now the control unit (not shown) is programmed to, at selected intervals between its normal operation as described above, open switches 31 and 32, close switches 33 and 34 to provide a voltage Vcc across the resistor 37 and the bottom sheet conductive layer 25 and put switch 35 in a state connecting the A/D-converter 36 to the connection point 38 between the resistor 37 and the bottom sheet conductive layer 25.

Knowing the applied voltage Vcc, the measured voltage Vts and the resistance Rs of the temperature stable resistor, the temperature of the touch screen bottom sheet is calculated, for example by using Ohm's law:

$$Rts = Vts \cdot Rs / (Vcc - Vts) \quad (1)$$

According to the invention, if the relationship between the electrical resistance and the temperature of the conductive layer 25 of the touch screen bottom sheet 22 is known, the resistance Rts is useful to determine the temperature of the sheet 22. For a given material, such as a specific polyester film covered with indium tin oxide, this relationship could be available from the manufacturer of the film material. Otherwise, it is easily established by simply measuring the electrical resistance of a sample of the material at a selected set of temperatures corresponding to the temperatures at which the LCD is specified to operate.

Figure 2:
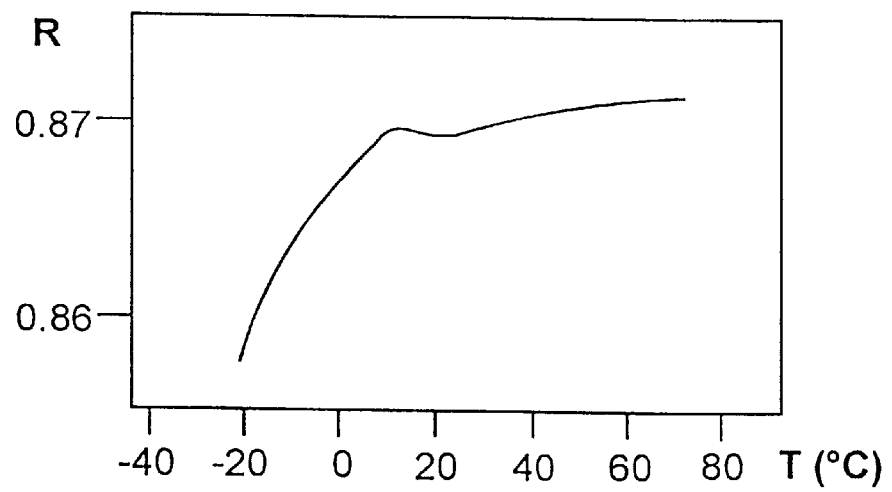
FIG. 2 is a diagram showing the relationship between electrical resistance (R) for a polyethylene terephthalate film and temperature (T).

An example of this is shown in the diagram of FIG. 2, which shows the relationship between electrical resistance (R) of a polyethylene terephthalate film covered with a conductive layer, and temperature (T). From the curve of the diagram it is apparent that the electrical resistance R of this particular film changes significantly within a temperature range from appr. −20° C. to +10° C. making it possible to establish a rather reliable relationship between temperature and resistance. At temperatures above appr. +10° C. a less reliable relationship can be established. Thus, with regard to the invention the polyethylene terephthalate film of FIG. 2 is suitable for use in applications wherein the operating temperature of the liquid crystals is within the range of −20° C. through +10° C.

Therefore, in order to decide which material to use for the bottom sheet of the touch screen it is necessary to estimate the operating temperature of the LCD to which the present invention is to be applied. Typically, the ambient temperature specified for the equipment that includes the LCD, e.g. a mobile phone or a portable computer, could be used as an approximation of the operating temperature.

Using equation (1) and a resistance-temperature diagram similar to that of FIG. 2 for the material currently used in the transparent sheet, the temperature of the touch screen bottom sheet 22 is determined. Since the top glass sheet 3 of the LCD has excellent heat conductivity, the temperature of the touch screen bottom sheet 22 is a good estimation of the temperature of the liquid crystals 6.

Thus, the temperature of the liquid crystals 6 can be estimated with good accuracy by measuring the voltage Vts between the resistor 37 and the touch screen bottom sheet conductive layer 25.

This procedure is well suited for automation, since the relationship between temperature and resistance of the touch screen bottom sheet can easily be transformed to an equation for implementation into a computer program being executed in a suitable micro processor. A computer program is also useful to control the measuring of Vts and to calculate the resistance of the touch screen bottom sheet Rts.

With the invention, a good estimation of the LCD temperature is obtained with already present components, such as the touch screen, due to the close contact between the touch screen bottom sheet and the LCD. Only one more component—a cheap resistor—and a non-complicated reprogramming of the control unit is necessary.

Also, as no additional transparent layers are added, no additional contrast loss is obtained.

Furthermore, as the touch screen covers the entire LCD surface any irregularities in the temperature distribution across the display surface are smoothed out since the measured resistance is an overall value taken over the entire touch screen bottom sheet. Thereby, a proper mean value for use when determining a temperature induced contrast adjustment of the LCD is provided, rather than a point estimation.

Figure 6:
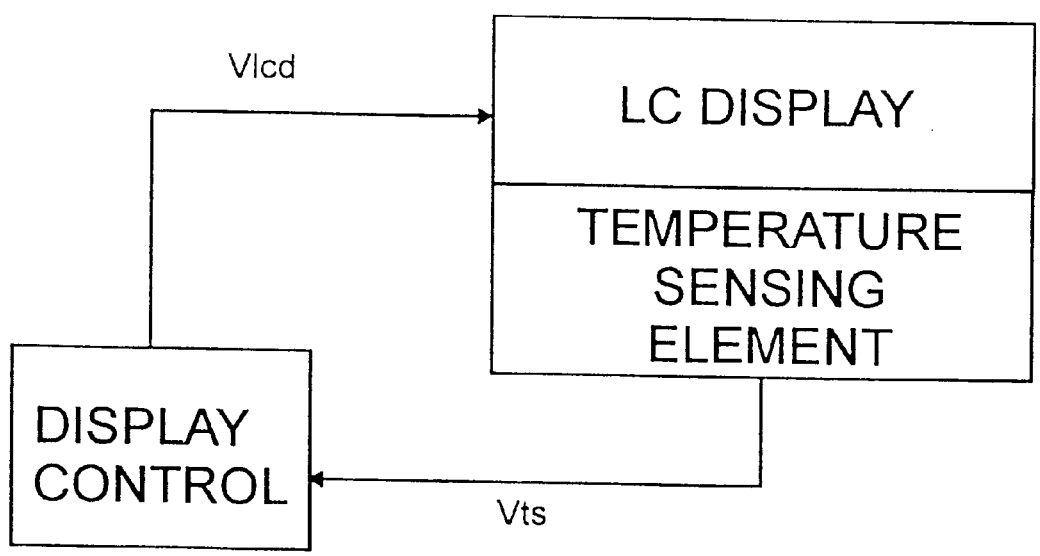
FIG. 6 is a schematic block diagram of a circuit for adjustment of a LCD display.

In order to illustrate the use of the temperature sensing element according to the present invention to adjust the contrast of a LCD, FIG. 6 shows a schematic block diagram of a circuit for adjustment of a LCD display.

According to FIG. 6, a TEMPERATURE SENSING ELEMENT, generally in the form of a touch screen bottom sheet acting in cooperation with a temperature stable resistor, is arranged in connection with a LC DISPLAY, as described above, to output a voltage signal Vts. The voltage signal Vts is transferred to a DISPLAY CONTROL, for example a designated preprogrammed microprocessor or a part of an overall control unit. The DISPLAY CONTROL responds to the applied voltage Vts with a LCD control voltage signal Vlcd that is transferred to the LC DISPLAY. However, contrast adjustment of a LCD is in itself conventional and well known to those skilled in the art, and therefore no further explanation is given on this matter in the present description.

The present invention is particularly useful for LCD's that are used for displaying visual information in mobile electronic units, such as mobile telephones, hand held computers etc.

Figure 7:
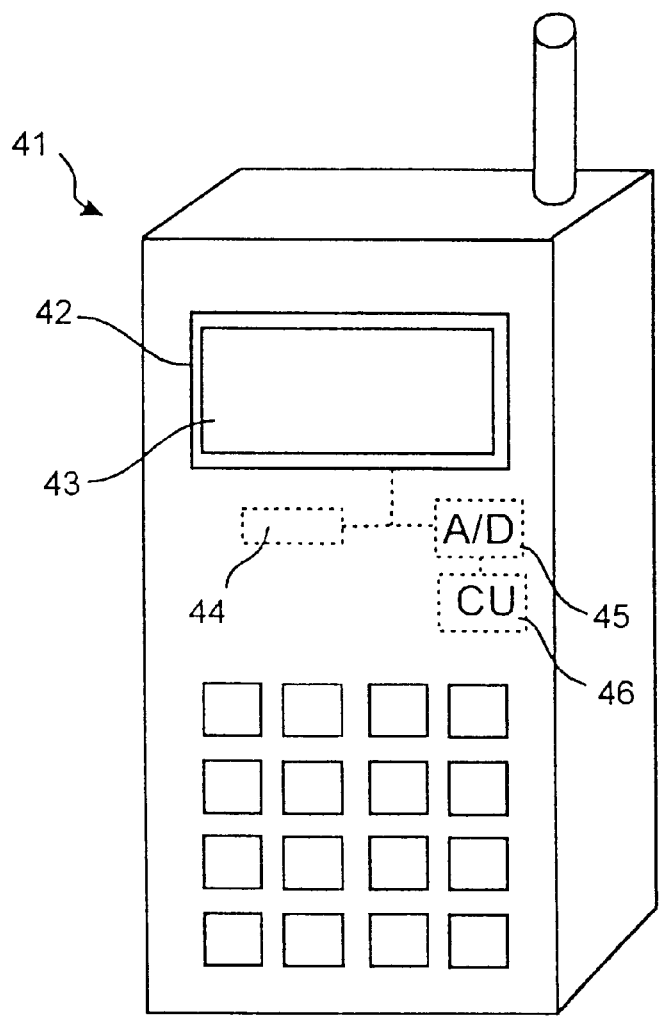
FIG. 7 is a schematical, partly transparent sketch of a mobile phone according to the invention.

For example, FIG. 7 schematically illustrates a mobile phone 41 provided with a LCD 43 and a touch screen 42 covering the LCD, whereby the touch screen bottom sheet is conductive, and acts as a temperature sensing element. The electronic unit of the mobile phone 41 comprises a temperature stable resistor 44, an A/D-converter 45 connected between the resistor 44 and the conductive layer of the touch screen bottom sheet 42 and a control unit 46 connected to the A/D-converter 45. The control unit 46 is programmed to perform the calculations described above. It should be noted that for simplicity voltage sources, ground potential terminals and contrast adjustment components are not shown, since these components are conventional and their use is very familiar to anyone skilled in the art. A mobile phone according to FIG. 7 has the advantage that the user is presented with a LCD that always shows information in good light contrast, regardless of the ambient temperature as well as the internal temperature of the mobile phone.

A similar arrangement is useful for a hand held computer.

Figure 8:
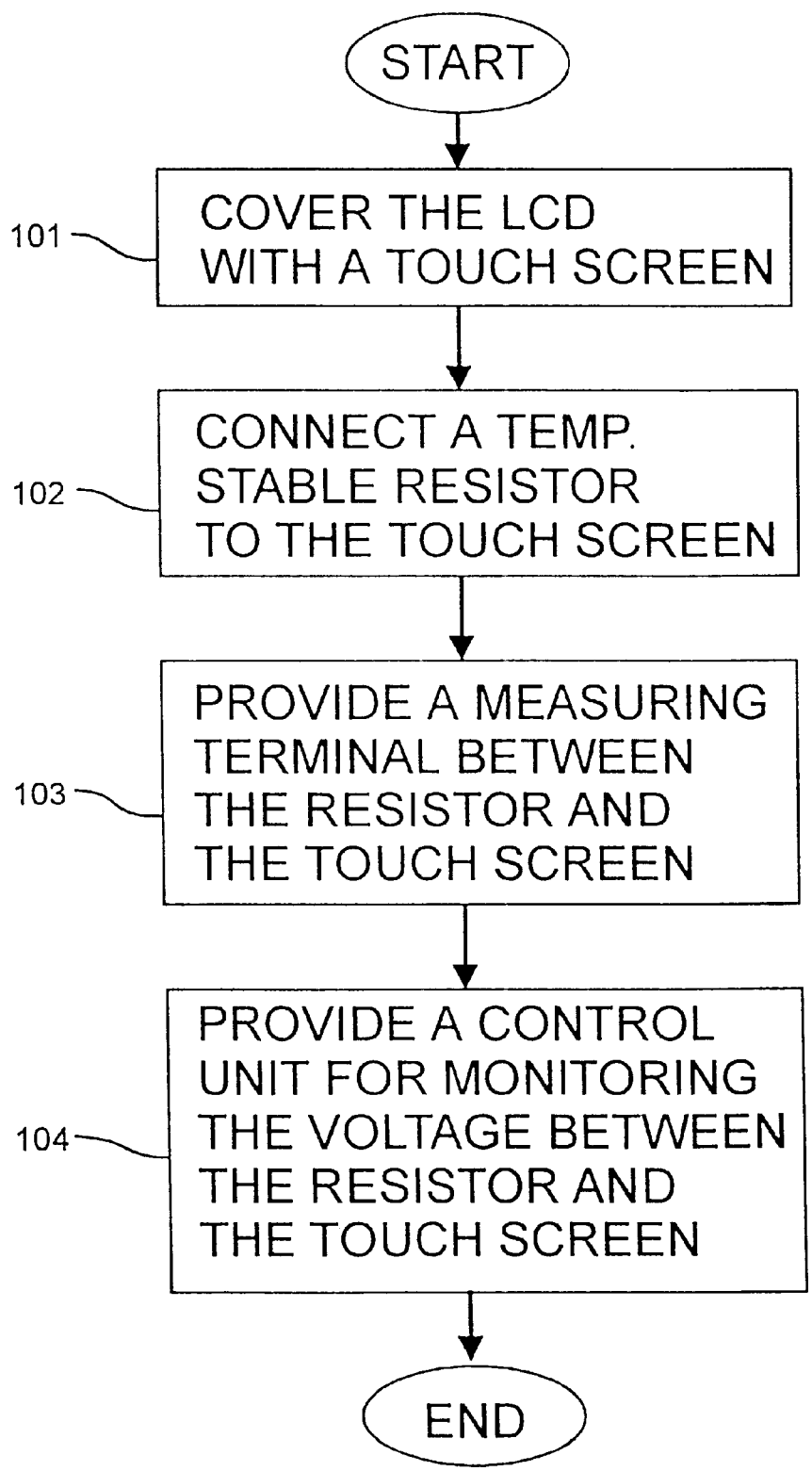
FIG. 8 is a flow chart illustrating a method for manufacturing a LCD temperature measuring device according to the invention.

FIG. 8 is a flow chart illustrating the steps of a method for producing a LCD temperature sensing touch screen assembly according to the present invention. The method includes the steps of:

covering a liquid crystal display (LCD) with a touch screen, as illustrated at 101, whereby the touch screen has a bottom sheet covered with a conductive layer as described above;

connecting a temperature stable resistor to the conductive layer on the touch screen bottom sheet, as illustrated at 102;

providing a measuring terminal between the temperature stable resistor and the conductive layer of the touch screen bottom sheet, as illustrated at 103; and providing a control unit for monitoring a voltage between the temperature stable resistor and the conductive layer of the touch screen bottom sheet, as illustrated at 103, whereby said voltage occurs in response to a voltage applied over the series of the temperature stable resistance and the conductive layer of the touch screen bottom sheet.

It should be understood that the scope of the present invention is not limited to the examples of embodiments described above, but is defined by the scope of the appended patent claims.

What is claimed is:

1. A device for measuring a temperature of a liquid crystal display (LCD), comprising:
   a touch screen applied to the LCD, the touch screen including a transparent bottom conductive layer arranged in a heat-conducting relationship with a top plate of the LCD to have substantially the same temperature distribution as the top plate of the LCD, an electrical conducting characteristic of the transparent bottom conductive layer thereby being dependent on a temperature of the top plate of the LCD; and
   means for measuring the electrical conducting characteristic of the transparent bottom conductive layer of the touch screen to determine a corresponding estimation of the temperature of the LCD.

2. The device of claim 1, wherein the electrical conducting characteristic is at least one of an electrical impedance of the transparent bottom conductive layer and a voltage across the transparent bottom conductive layer.

3. The device of claim 1, wherein the measuring means comprises:
   a temperature-stable resistor interposed between a voltage source and a first side of the transparent bottom conductive layer;

a return path connected to a second side of the transparent bottom conductive layer; and a measuring terminal interposed between the transparent layer and the temperature-stable resistor for measuring a voltage signal representative of the temperature of the LCD.

4. The device of claim 3, further comprising a control unit for monitoring the voltage signal and for adjusting a contrast level of the LCD in response to the voltage signal.

5. The device of claim 4, further comprising switching means that disconnects the return path and the voltage source when the control unit is not monitoring the voltage signal.

6. A mobile telephone having a LCD and a device for measuring a temperature of the LCD, the device comprising:

a touch screen applied to the LCD, the touch screen including a transparent bottom conductive layer arranged in a heat-conducting relationship with a top plate of the LCD to have substantially the same temperature distribution as the top plate of the LCD, an electrical conducting characteristic of the transparent bottom conductive layer thereby being dependent on a temperature of the top plate of the LCD; and means for measuring the electrical conducting characteristic of the transparent bottom conductive layer of the touch screen to determine a corresponding estimation of the temperature of the LCD.

7. The mobile telephone of claim 6, wherein the electrical conducting characteristic is at least one of an electrical impedance of the transparent bottom conductive layer and a voltage across the transparent bottom conductive layer.

8. The mobile telephone of claim 6, wherein the measuring means comprises:

a temperature-stable resistor interposed between a voltage source and a first side of the transparent bottom conductive layer;

a return path connected to a second side of the transparent bottom conductive layer; and a measuring terminal interposed between the transparent layer and the temperature-stable resistor for measuring a voltage signal representative of the temperature of the LCD.

9. The mobile telephone of claim 8, further comprising a control unit for monitoring the voltage signal and for adjusting a contrast level of the LCD in response to the voltage signal.

10. The mobile telephone of claim 9, further comprising switching means that disconnects the return path and the voltage source when the control unit is not monitoring the voltage signal.

11. A portable computer having a LCD and a device for measuring a temperature of the LCD, the device comprising:

a touch screen applied to the LCD, the touch screen including a transparent bottom conductive layer arranged in a heat-conducting relationship with a top plate of the LCD to have substantially the same temperature distribution as the top plate of the LCD, an electrical conducting characteristic of the transparent bottom conductive layer thereby being dependent on a temperature of the top plate of the LCD; and means for measuring the electrical conducting characteristic of the transparent bottom conductive layer of the touch screen to determine a corresponding estimation of the temperature of the LCD.

12. The portable computer of claim 11, wherein the electrical conducting characteristic is at least one of an electrical impedance of the transparent bottom conductive layer and a voltage across the transparent bottom conductive layer.

13. The portable computer of claim 11, wherein the measuring means comprises:

a temperature-stable resistor interposed between a voltage source and a first side of the transparent bottom conductive layer;

a return path connected to a second side of the transparent bottom conductive layer; and a measuring terminal interposed between the transparent layer and the temperature-stable resistor for measuring a voltage signal representative of the temperature of the LCD.

14. The portable computer of claim 13, further comprising a control unit for monitoring the voltage signal and for adjusting a contrast level of the LCD in response to the voltage signal.

15. The portable computer of claim 14, further comprising switching means that disconnects the return path and the voltage source when the control unit is not monitoring the voltage signal.

* * * * *